Aug. 31, 1965  TOSHIMASA KAIWA ETAL  3,204,136
TWO-PHASE STEPPING MOTOR
Filed June 2, 1961  5 Sheets-Sheet 5

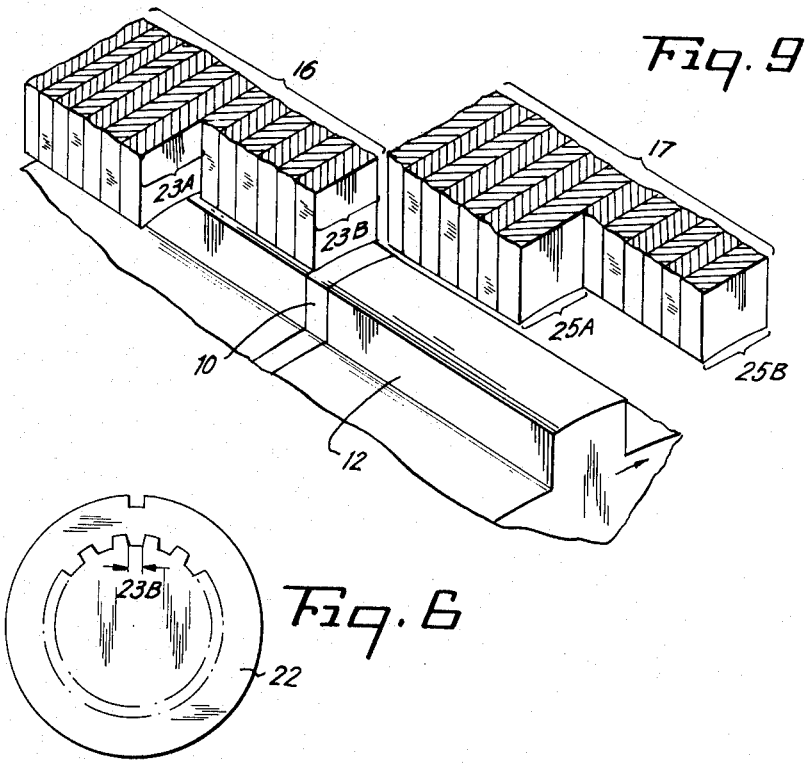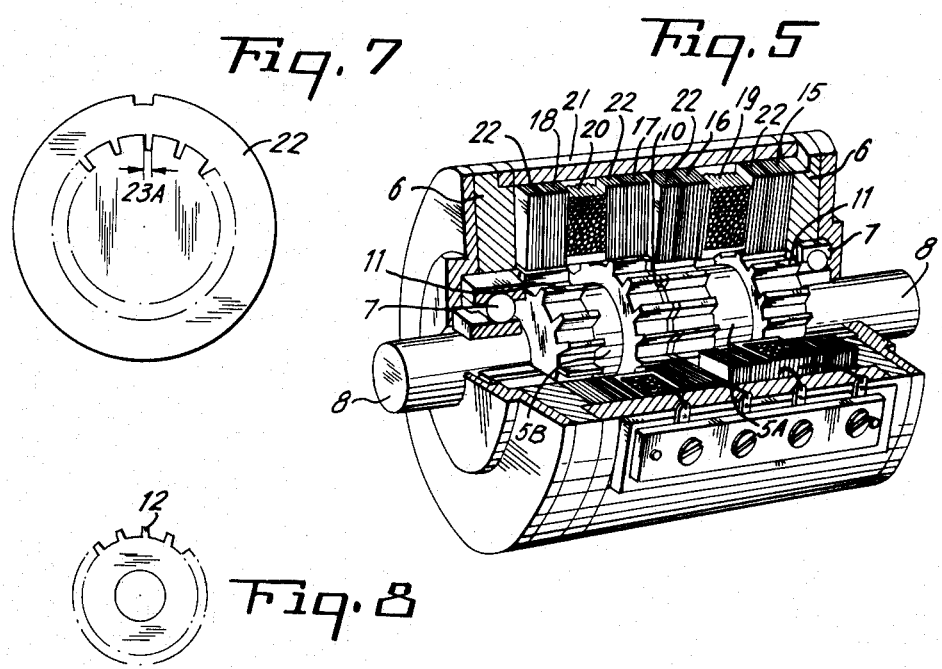

PULSE IN

3,204,136
TWO-PHASE STEPPING MOTOR
Toshimasa Kaiwa, Kawasaki-shi, and Rinzo Iwai, Tokyo, Japan, assignors to Fuji Tsushinki Seizo Kabushiki Kaisha, Kawasaki, Japan, a corporation of Japan
Filed June 2, 1961, Ser. No. 114,460
Claims priority, application Japan, June 6, 1960, 35/27,283
4 Claims. (Cl. 310—49)

Our invention relates to stepping motors which rotate a given angle in response to successively applied electrical input signals. Such motors are available in different structures and types.

An object of the invention is to provide a two-phase stepping motor for reliable rotation in a predetermined direction that combines a simple structure with higher efficiency than heretofore afforded by stepping motors.

Other objects of the invention, its advantages, and the means by virtue of which they are achieved, will be described with reference to the accompanying drawings, wherein:

FIG. 5 is a perspective view of an embodiment of the stepping motor of the present invention;

FIG. 6 is an axial view of a stator component of the stepping motor of the present invention;

FIG. 7 is an axial view of another stator component of the stepping motor of the present invention;

FIG. 8 is an axial view of a rotor component of the stepping motor of the present invention;

FIGS. 9, 10, 11, 12 and 13 illustrate the stepping of the rotor member of the stepping motor of the present invention;

In the figures, the same components are indicated by the same reference numerals.

Figure 1:
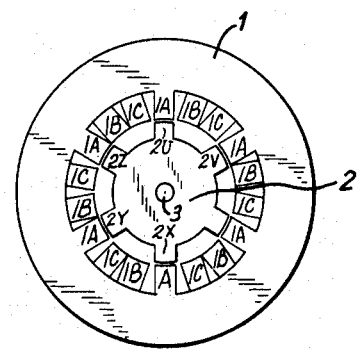
FIG. 1 is explanatory and is a schematic axial cross-section of a known stepping motor.

Referring to FIG. 1, a three-phase stepping motor generally comprises a cylindrical stator 1 with a multitude of interiorly-directed radial magnetic poles 1A, 1B, 1C, and a cylindrical rotor 2 coaxially rotatable within the stator 1 and possessing a multitude of outwardly-directed radial magnetic poles 2U, 2V, 2W, 2X, 2Y, 2Z. An axial bearing-supported shaft 3 integrally forms a part of the rotor 2 and imparts to an exterior receiving device, not shown, the rotary motion of the rotor. The stator poles 1A occupy regularly spaced positions within the interior circumference or periphery of stator 1 along the same axial position, that is, in essentially the same plane transverse to the common axis of the rotor 2 and stator 1. An equal number of poles 1B and 1C similarly occupy regularly spaced positions within the interior circumference or periphery of stator 1 and along two other axial positions. Preferably the three axial positions are spaced equally along the axis. The angular positions occupied by the poles 1B and 1C are regularly displaced from the poles 1A by one-third and two-thirds respectively of the angular distance between individual ones of poles 1A.

The rotor poles 2U to 2Z occupy regularly spaced positions about the rotor circumference along each of the axial positions of stator poles 1A, 1B, 1C. In each axial position, the number of rotor poles equals the number of stator poles. However, the rotor poles in each axial position occupy angular positions aligned with the rotor poles at the other axial positions.

Suitable field windings for each set of poles 1A, 1B, 1C, and three-phase commutating means, not shown, impart magnetic excitation to the poles 1A, 1B, and 1C successively, thereby intermittently rotating the rotor 2 by the respective magnetic fields of the poles. The rotor 2 rotates in one direction when the stator poles are excited and commutated in the sequence A, B, C, whereas the rotation occurs in the other direction when the sequence is C, B, A. Switching of excitation from one set of poles to the next occurs each time an input pulse is fed to the commutating means. In the intervals between pulses one of the three sets of poles, for example, the pole set 1A in the position of FIG. 1, remains excited. Thus application of an input pulse immediately revolves the rotor by one step in the clockwise or counterclockwise direction and locks the rotor in the position to which it has advanced. Accordingly, the motor maintains intermittent rotation as long as signals are continuously applied.

In FIG. 1, to selectively run the rotor in either direction according to the applied input signals, the provision of three phases of operation is indispensable. However three-phase motors are complex and uneconomical in many instances, particularly for those cases where reversibility of the direction of rotation is unnecessary. In such cases a one-way stepping motor should perform high speed intermittent rotation.

Thus, a more specific object of the invention is to provide a simple two-phase stepping motor for unerring rotation in one direction.

It is another object of the invention to reduce the complexity inherent in stepping motors of the three-phase type which are selectively operable in either direction, by providing a much simpler selectively-reversible two-phase motor.

According to a feature of our invention, in a stepping motor, we coaxially mount stator and rotor members for rotation relative to each other. We provide each of the stator and rotor members with circumferentially and regularly spaced poles extending towards the poles of the other member and terminating at ends having equal widths in the circumferential direction. Moreover, on one member we provide on one corresponding circumferential side of each pole a magnetic extension having a thickness transverse to the circumferential width less than the thickness of each pole but extending just as far toward the poles of the other member. We align the poles on the other member to confront the alternate angularly-spaced poles on the first member and we provide means for alternately magnetizing all the alternate poles on the first member. Such a structure is capable of one-way rotation by two-phase excitation.

According to another feature of our invention, we construct the poles of the first member from lamellar pieces overlying each other in the direction transverse to the circumferential width. We give each piece the same length but make some of them wider so that their extra width will extend circumferentially outward from behind the narrower pieces only on one side of the narrower piece and from the aforementioned magnetic extension.

According to still another feature of our invention, we mount the rotor so that it can be selectively shifted axially between two positions in order to thereby reverse the direction of rotation. For this purpose we provide the first member with two sets of poles, each set corresponding to one rotor position. We place the magnetic extension on one corresponding circumferential side of each pole in one set and on the other corresponding circumferential side of each pole in the other set. Preferably the poles are analogously constructed of lamellar pieces. Therefore when one set of poles confront their counter-poles in one rotor position, the motor rotates in one direction determined by the arrangement of the pole pieces in this set, whereas in the other position the motor revolves in the opposite direction.

According to a further feature of our invention, we mount the poles on each member so that they extend radially and so that the thicknesses are measured in the axial direction. We further combine the poles of one set with the corresponding poles of the other set into a single set and locate one circumferentially directed extension on one circumferential side of each pole at the forward axial end of that side, and the other circumferentially directed extensions on the other circumferential side of each pole at the rear axial end of that other side. Thus, the poles as they extend toward the poles of the other members terminate in a Z-shaped area. The thickness of each pole is such that when the rotor assumes one axial position the poles of the second member are influenced by the main part of the pole and only by those extensions in one circumferential direction thereby effecting rotation in one direction only. When the rotor assumes the other axial position the poles of the second member are influenced in addition to the central part of the pole only by those extensions in the other circumferential direction thereby effecting rotation in the other direction.

Further details of the stepping motors according to the invention will now be described with reference to FIGS. 2 to 9 wherein the stator 4 and the coaxial rotor 5 constitute the stepping motor. Non-magnetic end frames 6 forming a part of the stator 4 coaxially hold, at the ends of the stator, suitable rotor-supporting bearings 7 which in turn rotatingly embrace a pair of outwardly directed coaxial shaft members secured to the rotor 5 and forming a part thereof. The rotor 5 comprises essentially two coaxially aligned magnetic spool-shaped members 5A and 5B, mounted for rotation on the shafts 8, and washers 9 to centrally locate the spool-shaped members between the bearings 7. A non-magnetic disc 10 mechanically joins the members 5A and 5B while magnetically separating them. The respective cylindrical steps 11 of the spool-shaped members 5A and 5B integrally include at their circumferences or peripheries a plurality of angularly spaced rotor poles 12 having rectangular cross-sections and terminating in convex cylindrical faces 13. The poles on each cylindrical step in each spool are in alignment with the poles of the other steps and occupy positions at regular angular or circumferential intervals. When rotated, the pole faces in each spool step form a single band-like locus or path.

Figure 2:
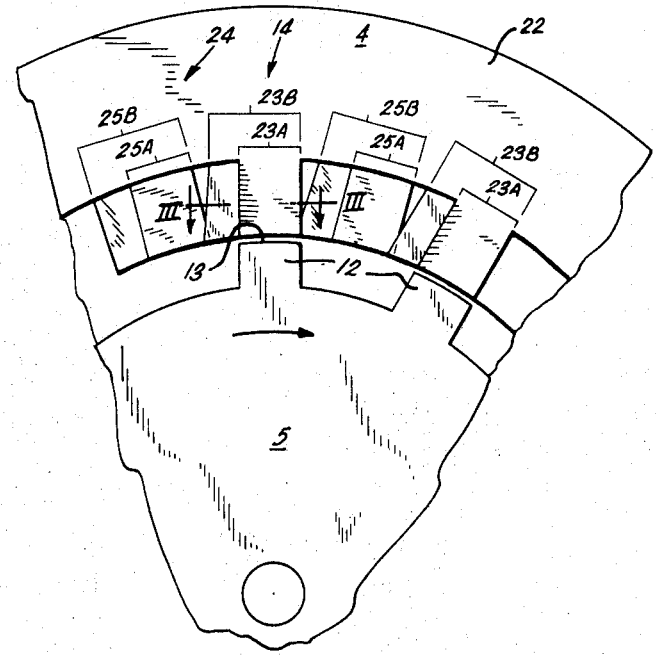
FIG. 2 is a partial axial view illustrating aligned stator and rotor poles of an embodiment of a stepping motor of the present invention.
Figure 3:
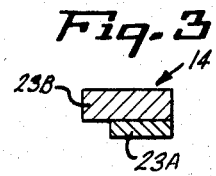
FIG. 3 is a cross-section of a single stator pole taken along the line III—III of FIG. 2.

Confronting each of the convex cylindrical faces 13 (see FIG. 2), at a convenient clearance distance, are portions of complementarily concave cylindrical faces on stator poles 14. The stator poles 14 constitute a part of the stator 4. The stator 4 comprises four axially spaced, coaxial, annular, ring sections 15, 16, 17 and 18 surrounding the respective steps 11 of the spools 5B and axially embracing toroidal coils 19 and 20, the frames 6. A magnetic cylinder 21 encloses the ring sections and the coils. The ring sections 15 and 16 integrally include the poles 14 and each comprise two laminated overlying flat annular discs 22 having regular angularly spaced interior projections 23A and 23B which form the poles 14. Each interior projection or piece 23A extends angularly or circumferentially over a smaller distance than the projection or piece 23B, and aligns therewith to form each pole 14 with an L-shaped cross-section as shown in FIG. 3. The total thickness along the common axis of the motor of each pole 14 corresponds exactly to the thickness of the confronting rotor pole. The angular or circumferential width of piece 23A corresponds exactly to the angular or circular width of the poles 12. Projections or pieces 23B are positioned with the right-hand radial edge, as seen in FIGS. 2 and 3, directly behind the right-hand radial edge of the projections or pieces 23A. The left-hand edges of pieces 23B thus extend counter-clockwise from the left-hand edges of projections 23A. The projections 23A and 23B terminate interiorly in concave circumferential edges to thereby give to the poles concave cylindrical faces. The faces in which the poles terminate, are spaced over their entire area a uniform distance from the band-like path formed by the faces 13 of the rotating rotor 5. The ring sections 17 and 18 are substantially identical with ring sections 15 and 16 but the poles 24 formed by the projection 25A and 25B occupy angular positions between the poles 14.

Figure 11:
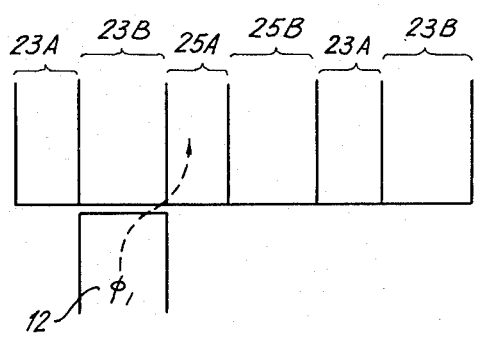

Electrically the coils 19 and 20 alternately receive energy from a source 26 by way of a flip-flop or bistable multivibrator circuit as shown in FIG. 11 and in response to pulses applied thereto. The coils 19 and 20 operate as the respective collector impedances between the collectors of power switching transistors 27 and 28, respectively and the negative terminal of the source 26. Coupling resistors 29 and 30 join the collector of each of the transistors 27 and 28 to the base of the other transistor. A common emitter resistor 31 connects the emitters of both transistors to the grounded positive terminal of source 26. Negative input pulses are applied across the resistor 31 and turn on the previously non-conducting transistor and turn off the previously conducting transistor. The circuit maintains the condition of conduction caused by the last pulse until a succeeding pulse.

In operation, when transistor 27 conducts, the coil 19 receives energy from the source 26 and excites the poles 14. Because the pieces 23B are circumferentially, circularly or peripherally wider than any rotor pole 12, and because the faces of pieces 23B are uniformly spaced from the path of travel of face 13, they impart no torque to the rotor poles as long as the faces 13 confront the poles 14 within the circumferential width of the pieces 23B. Therefore the attraction of piece 23A exclusively governs the position of the rotor pole and the pole stops precisely where it confronts the piece or projection 23A as shown in FIG. 2.

A negative pulse applied to resistor 31 of the flip-flop circuit in FIG. 11 causes transistor 28 to conduct and turns off transistor 27. This energizes coil 20 and excites poles 24. Because the poles 12 are not located within the width of pole pieces 25B, the entire pole 24 is effective to attract the poles 12 from the position in FIG. 2. In FIG. 2 the pieces 25B to the right of poles 23B, i.e. in the poles 24 clockwise of poles 14, extend so far counter clockwise and over the poles 12 in spool 5A, that part of the faces 13 confront the pieces 25B. Accordingly the poles 24 clockwise of poles 14 always attract the poles 12 to effect clockwise and stepwise rotation of rotor 5. When, however, the circumferential width of poles 12 travel entirely within the width of pieces 25B, the latter no longer exert force upon the poles 12. Rather only the pieces 25A of poles 24 attract the poles 12 and lock the rotor 5 in a position precisely confronting the poles 24 within the respective peripheral widths of pieces 25A. As long as no new pulse appears across resistor 31, coil 20 remains energized and the rotor maintains the last-mentioned position.

Upon occurrence of a new negative pulse, transistor 27 again conducts and coil 19 excites poles 14, the extreme left-hand end of pieces 23B now extend toward poles 24 and face a small part of the poles 12, which precisely confront the poles 24, so that the poles 14 clockwise of the poles 24 attract the poles 12 far more heavily than the poles 14 counter clockwise of poles 24. Clockwise rotation of rotor 5 results until the rotor poles 12 again confront the portions 23A of poles 14. Continued pulsing effects continued stepwise rotation of rotor 5 in the clockwise direction without reversal.

Figure 4:
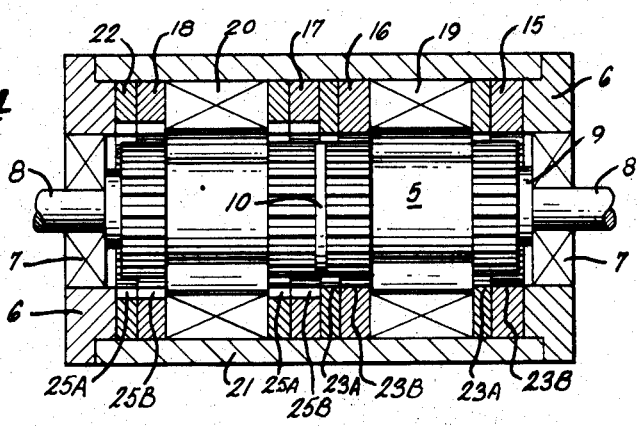
FIG. 4 is a longitudinal section of the embodiment of the stepping motor of FIGS. 2 and 5.

FIG. 5 is a perspective view of the embodiment of FIGS. 2, 3 and 4. FIGS. 6, 7, and 8 illustrate stator and rotor components of the embodiment of FIGS. 2, 3 and 4.

Figure 10:
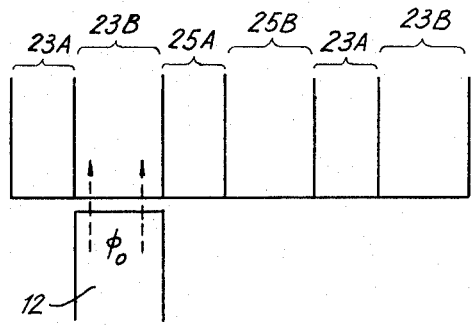

FIGS. 9, 10, 11, 12 and 13 illustrate the stepping of the rotor of the embodiment of FIGS. 2, 3 and 4. When the coil 19 is continuously excited, the rotor pole 12 is attracted to the stator pole piece 23B due to the magnetic flux $\phi_0$ and stops in a position wherein the rotor pole 12 directly confronts the stator pole piece 23B, as shown in FIG. 10.

When the stator pole pieces 23A and 23B of the stator pole 14 are deenergized or demagnetized and the stator pole pieces 25A and 25B of the stator pole 24 are simultaneously energized or magnetized, the rotor pole 12 is attracted to the stator pole piece 25A due to the magnetic flux $\phi_1$, as shown in FIG. 11.

Figure 12:
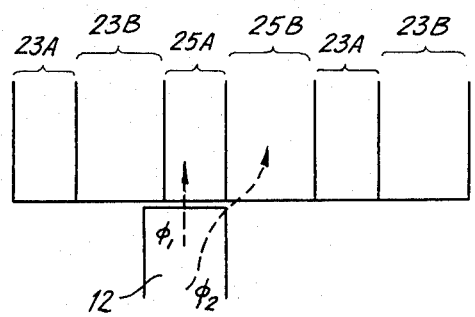
Figure 13:
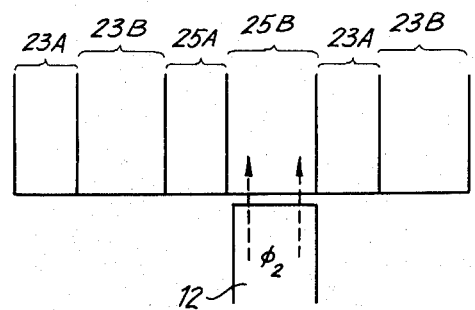

When the rotor pole 12 is positioned sufficiently close to the stator pole piece 25B, as shown in FIG. 12, the rotor pole 12 is attracted to the stator pole piece 25B due to the magnetic flux $\phi_2$ and stops in a position wherein the rotor pole 12 directly confronts the stator pole piece 25B, as shown in FIG. 13, and the rotor has completed one step.

Figure 14:
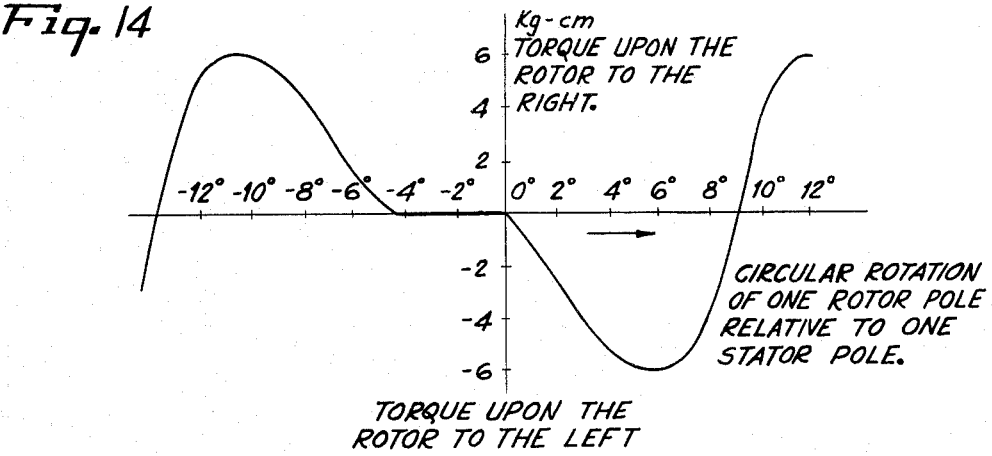
FIGS. 14 and 15 are rectangular coordinate graphs of typical torque characteristics due to the wide and narrow parts respectively of the pole pieces of the motor of FIGS. 4 and 5.
Figure 15:
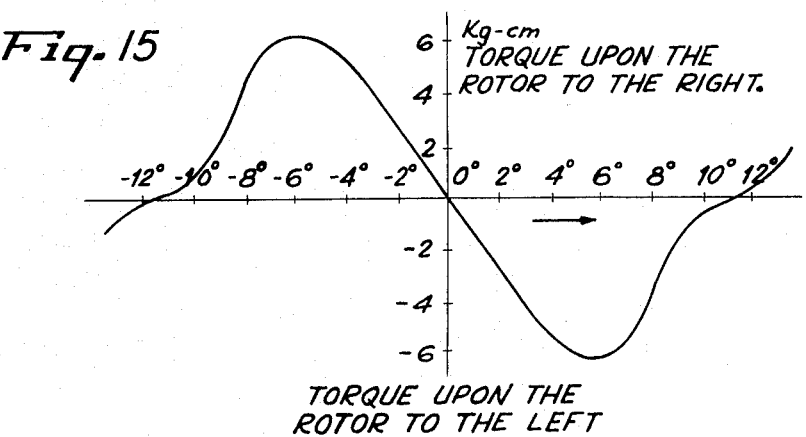
Figure 16:
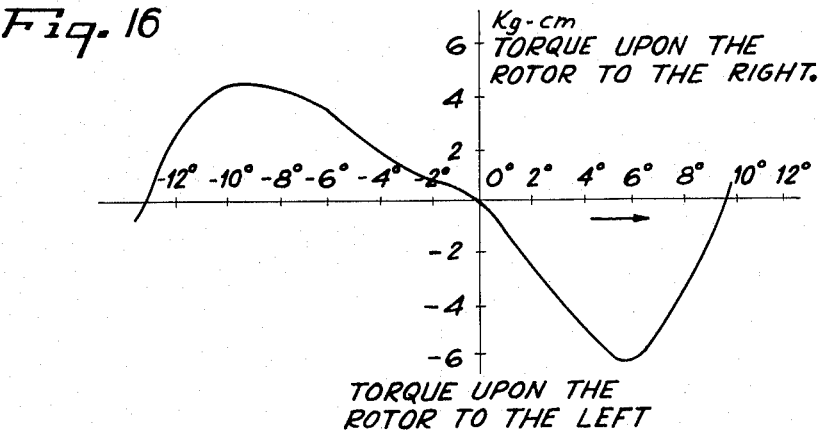
FIG. 16 is a rectangular coordinate graph of the resultant torque characteristics derived from FIGS. 14 and 15.

FIGS. 14, 15 and 16 show the torque characteristic curves of the motor of FIGS. 2, 3 and 4 when the stator poles 14 and 24 each have narrow and wide portions 23A and 25A, 25B, where the axial thicknesses of portions 23A and 25A equal the axial thicknesses of portions 23B and 25B.

In these curves, the position of rotor 5 shown in FIG. 2, where pole 12 precisely confronts the pole 14 within the width of piece 23A is considered the initial, zero, or reference position. It will be remembered that the circumferential, peripheral or circular width of poles 12 corresponds exactly to the circumferential width of pole pieces or portions 23A and that the confronting faces are complementarily concave and convex. The abscissa indicates the departure of the rotor 5 from this initial position in degrees of rotation. Departure to the left or counterclockwise appears as negative departure measured in minus degrees and departure to the right or clockwise appears as positive departure measured in plus degrees. The upper or positive ordinate measures torque imparted to the poles 14 to the right or clockwise direction and the lower or negative ordinate measures torque to the left or in a counterclockwise direction.

FIG. 14 represents the torque that the wide pieces 23B of poles 14 impart to the poles 12 of rotor 5 as a result of departure of these poles from the starting position. FIG. 15 represents the torque imparted to the poles 14 by the narrow pieces 23A. FIG. 16 represents a composite of the torques in FIGS. 14 and 15. While poles 14 are assumed energized, FIGS. 14, 15 and 16 represent as well departures from the position of the poles 12 confronting the portions 25A of poles 24 when poles 24 are energized.

Referring to FIG. 14, when the poles 12 shift to about 5° to the left of the starting position, the wide portions of the poles 14 exert no force whatever. However, the narrow portions of poles 14 as seen from FIG. 15 exert a positive torque to the right so as to lock the rotor in the starting position. When the rotor, however, shifts further to the left, both the wide and narrow portions impart considerable torque to the rotor to return it to its starting position. When the rotor is shifted to the right, even more torque exists to return the rotor to the starting position. At a position approximately 11° to the left of the starting position the force exerted by the wide portions toward the right decreases sharply because the poles 12 would then approach the next pole 14 which would exert its own torque and cancel the torque applied by the other pole 14. To the right the effect of the adjacent pole 14 exerts itself far sooner. In fact, by the time the rotor has reached a position 9° from starting, the effect of the wide portion of the adjacent pole 14 is as great as the effect of the wide portion of the original pole 14. This 9° position occurs even before the poles 12 precisely confront the pole 24.

Referring to FIG. 16, we see from the composite torque the effect of the composite pole 14 when the rotor assumes various positions. The positions of most interest correspond to those assumed by the rotor when the poles 12 precisely confront the portions 25A of pole 24. This would of course correspond to the position held by the rotor just prior to the poles 14 receiving energy. This corresponds to a position of 12° to the right or to the left of starting. Thus, when pole 14 receives energy from the coils and pole 12 confronts the pole portion 25A immediately to the left of pole 14, a large positive torque to the right exists upon the poles 12. Similarly, the pole confronting the pole portion 25A immediately to the right of pole 14 receives substantially no leftward pull and the entire torque exerted upon the rotor is to the right.

An outstanding feature of the composite torque shown in FIG. 16 is the braking effect it exercises when the pole 14 attracts a rotor pole 12 which has just passed the position where portion 23A precisely confronts the rotor pole.

FIG. 16 shows this effect in the negative right-hand section of the curve, where the curve forms a steep slope because the rotor receives negative torque by the portion 23A as well as the portion 23B of pole 14. Such remarkable braking effect is one of the important factors required of a stepping motor.

As is evident from the foregoing description, the stepping motor of the invention possesses a simple structure and is capable of unerring one-way rotation by means of two-phase excitation. In addition, the torque characteristics of the motor are determined, as desired, by selective shaping of the stator or rotor poles and may be easily composed of the respective torque characteristics of the individual pole pieces. Thereby, although it can be easily produced and designed to carry out specific functions, it operates with high precision compared with the traditional type wherein the stator assumes a complicated shape. Again, as is shown in FIG. 15 and FIG. 16, the motor exhibits an excellent braking torque and functions as a most favorable stepping motor that rotates by one step at every application of one input pulse. In the illustrated example of FIGS. 2, 3 and 4, each stator pole possesses two pieces, one wide and the other narrow. However, our invention also contemplates building up the pole with a multitude of flat rings to make up the thickness of the narrow portion and another multitude to make up the thickness of the wide portion. Thus, each ring made up of the discs is composed of a plurality of laminations rather than two laminations. The description confines itself to cases where the principles of our invention apply to the stator poles; the invention, however, contemplates applying the structure of the stator poles to the rotor poles rather than the stator poles, to thereby obtain the same operation of the motor.

Figure 17:
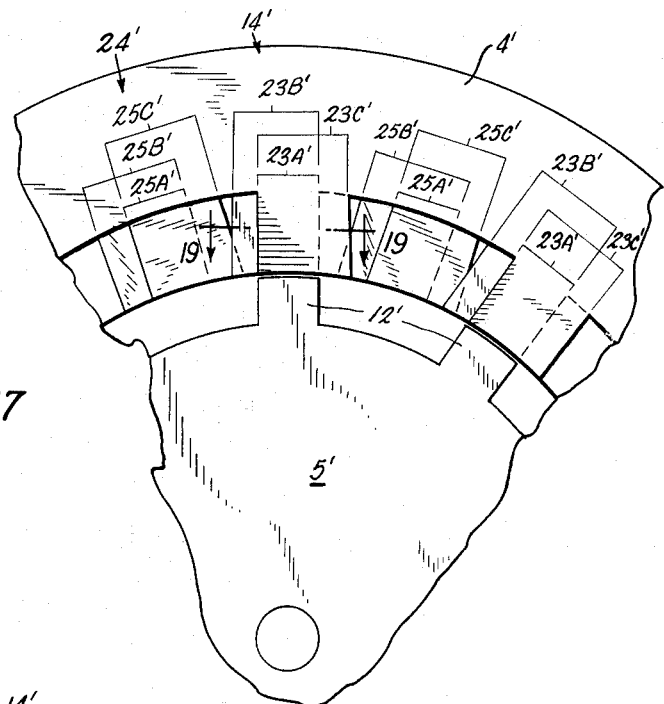
FIG. 17 is a partial axial view illustrating aligned stator and rotor poles of another embodiment of a stepping motor of the present invention.
Figure 19:
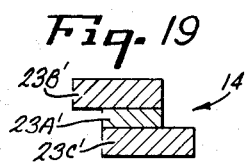
FIG. 19 is a cross-section taken along the line 19—19 of FIG. 18.
Figure 18:
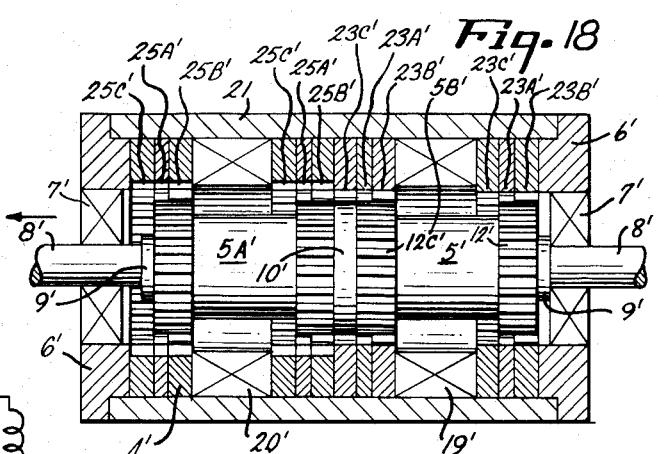
FIG. 18 is a longitudinal section of the embodiment of the stepping motor of FIG. 17.

FIGS. 17, 18 and 19 illustrate another embodiment of our invention. In the stepping motor of FIGS. 17, 18 and 19, the rotor may receive a selective setting for clockwise or counterclockwise rotation according to the axial position of the rotor shaft. The rotor structure in FIGS. 17 and 18 substantially corresponds to that of FIGS. 2 and 4, and the stator structure corresponds to FIGS. 2 and 4 with the exception of the structure of the stator poles, to be more specifically described. In addition, the bearings 7' occupy positions slightly farther apart relative to each other so as to provide clearance between the washers 9' and said bearings. This enables axial movement of the rotor 5' upon its shaft between two axial positions in one of which the washer 9' bears against the bearing 7' to the right and in the other of which the washer 9' bears against the bearing to the left.

In FIG. 18, instead of each stator pole possessing two disc-like pieces, one for providing the pole with a wide portion and the other for providing the pole with a narrow portion, the pole 24' comprises three pieces or projections. Two of the pieces possess interior projections having wide circumferential peripheral or circular width and sandwiched between them a piece having interior projections of narrow circumferential width. The total of the projections correspond in number and occupy positions to display a cross section shown in FIG. 19. Each projection terminates in a circumferential concave edge corresponding complementary to the circumferential convex edge on the pole 12'. The thickness of the pieces are such that any combination of pieces, one of which has the wide circumferential projections and the other of which has the narrow circumferential projections, corresponds precisely to the axial thickness of the rotor poles 12'. The pieces having the circumferentially wide interior projections are designated 23B', 23C' and 25B', 25C', whereas the pieces having the narrow circumferentially directed projections are designated 23A' and 23B'.

Figure 20:
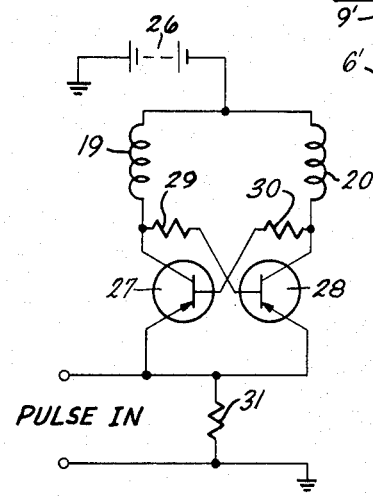
FIG. 20 is a schematic circuit diagram of means for energizing the stopping motor of the present invention.

Corresponding to the motor of FIGS. 2, 3 and 4, the pieces of the poles 24' in the left half of the motor confront the poles 12' in the left half of the motor and the pieces 23A', 23B' and 23C' confront the poles 12' in the right half of the rotor 5', the non-magnetic disc 10' combining the rotor sections 5A' and 5B'. A clutch, not shown, serves to selectively move the rotor 5' between the extreme axial positions. In the position on the right-hand side, the rotor poles 12' confront the thickness of the pieces 23A' and 23B' and the non-magnetic disc 10' confronts one of the pieces 23C'. In the same position the rotor poles 12' confront the pieces 25A' and 25B', whereas in the opposite position, the rotor poles correspond in axial thickness to the pieces 25C' and 25A' and 23C' and 23A'. Thus, in either of the extreme positions the effect upon the rotor is precisely the same as if the third pole-producing piece were non-existent. For example, when the rotor is in the extreme right-hand position, the pieces 23B' will cause the poles 14' to impart to the rotor a clockwise step in response to every pulse applied to the circuit in FIG. 20. On the other hand, when the rotor receives an axial shift from the magnetic clutch to the left, only the pole pieces 25C' and 25A' and 23C' and 23A' impart motion to the rotor so that in response to a pulse into the circuit of FIG. 20, the rotor performs a counterclockwise step. In this manner a two-phase stepping motor is capable of clockwise or counterclockwise rotation according to the axial rotor position, and motors of this type are highly effective when applied to such mechanisms as the carriage or the ribbon drive of a typewriter.

Motors according to the invention have the following advantages. In building up the stator poles from a number of pieces or discs, each piece or disc can itself be formed from laminating thin magnetic plates so as to achieve a prescribed width. Then all the pieces are piled up into any desired shape. The invention contemplates this construction. Adoption of this construction permits shaping the rotor poles by laminated magnetic plates or by simple means of cutting or casting. Another advantage of the structure according to the invention is that it makes possible shifting the rotor described with respect to FIGS. 17, 18 and 19.

Equipping the stator or the rotor with two sets of poles in the manner described renders possible making both sets share part of the pole pieces, as shown in FIGS. 17, 18 and 19.

While specific embodiments of the invention have been shown and described in detail, the invention may be embodied otherwise, without departing from the essential features of our invention and within the scope of the claims annexed hereto.

We claim:

1. A two-phase stepping motor comprising coaxial stator and rotor members each having circular circumferences and one of which has two sets of circumferentially-spaced poles, the rotor member being axially shiftable relative to the stator member so as to take two different positions, means for alternately energizing alternate circumferentially-spaced poles of both sets of poles of one of said members, each pole on the one of said members including two flat overlying pieces having respective edges transverse to the circumference of the members, the edges of pieces of a first set of said sets of poles coinciding with one another at one edge and those of pieces belonging to a second set of said sets of poles coinciding with one another at their respective other edges, poles on the other of said members at one of the said rotor member positions confronting alternate one of the first set of the poles of said one of said members so as to rotate the rotor member exclusively in the direction determined by the arrangement of the pole pieces of the first set of said sets of poles, said poles on the other of said members confronting the second set of poles on said one of said members at the other rotor member position so as to rotate said rotor members in the reverse direction determined by the arrangement of the pole pieces of the second set of said sets of poles.

2. A two-phase stepping motor comprising coaxial mutually rotatable stator and rotor members shiftable relative to each other between two axial positions, two sets of circumferentially-spaced magnetic poles on a first of said members, one set of circumferentially-spaced magnetic poles on a second of said members for confronting in each axial rotor position the alternate circumferentially-spaced poles in a different one of the sets of poles of said first of said members, means for alternately energizing the alternate circumferentially-spaced poles of the two sets of poles upon said first member, and a diminished magnetic extension on the respective poles of the two sets of poles on said first member extending in one circumferential direction in one set of poles and the other circumferential direction in the other set of poles but extending toward the poles of said second member as far as the circumferentially-spaced poles in each set, to thereby attract when magnetized and in each relative axial position of said members the pole of the second member, whereby the rotor member is intermittently rotated in a direction depending only on the relative axial position of said members.

3. A two-phase stepping motor comprising coaxial stator and rotor members each having circular circumferences and one of which has two sets of circumferentially-spaced radially-directed poles, the rotor member being axially shiftable relative to the stator member so as to take two different axial positions, means for alternately energizing alternate circumferentially-spaced poles on both sets of poles in one of said members, each pole on the one of said members including two flat overlying pieces of uniform radial length and having radially-directed edges, the edges of pieces of the first set of poles coinciding with one another at one edge and those of pieces of the second set of poles coinciding with one another at their respective other edges, poles on the other of said members confronting at one of the said rotor positions alternate ones of said first set of the poles of the one of said members so as to rotate the rotor exclusively in the direction determined by the arrangement of the pole pieces of said first set of poles, said poles on the other of said members confronting the second set of poles on the one of said members at the other rotor member position so as to rotate the rotor member in the reverse direction determined by the arrangement of the pole pieces of said second set of poles.

4. A two-phase stepping motor comprising coaxial mutually rotatable stator and rotor members shiftable relative to each other between two axial positions, radial circumferentially-spaced magnetic poles on the first of said members terminating in end faces of a predetermined circumferential width, and radial circumferentially-spaced magnetic poles on the second of said members terminating in end faces of the predetermined width and located to confront in both axial rotor member positions during mutual rotation of said members alternate pole faces on the first member, said faces defining between each other during mutual rotation a narrow clearance band, the poles on said first member having in two respective axially offset radial planes magnetic extensions in opposite respective circumferential directions and along the clearance path, said stator in each axial position during the mutual rotation confronting the poles and only the extensions in one radial plane, and means for magnetizing alternate poles on said first member whereby the rotor member intermittently rotates in a direction depending only on the relative axial positions of said members.

References Cited by the Examiner

UNITED STATES PATENTS 2,808,556  10/57  Thomas _____ 310—49 X
3,005,118  10/61  Ranseen _____ 310—49

ORIS L. RADER, *Primary Examiner.*

MILTON O. HIRSHFIELD, *Examiner.*